Feb. 23, 1943. A. J. PALKO 2,311,901
AIR VENT
Filed Dec. 18, 1940
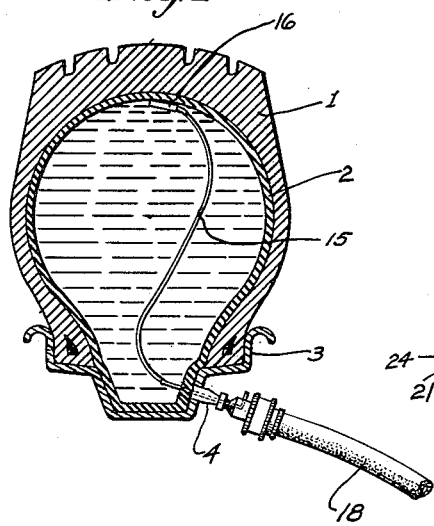
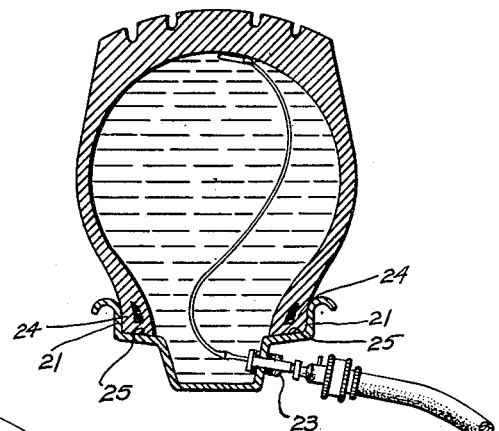
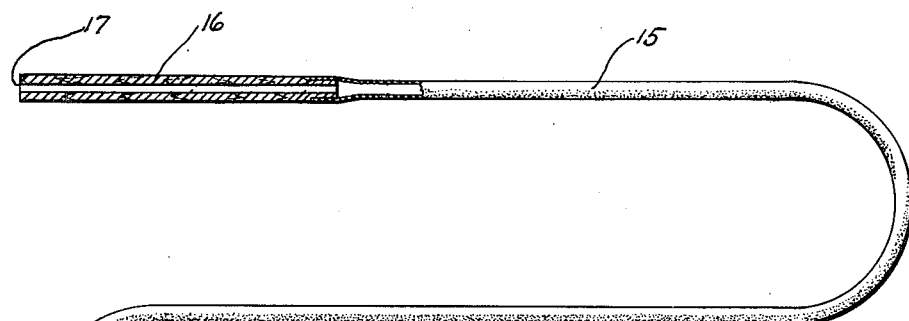
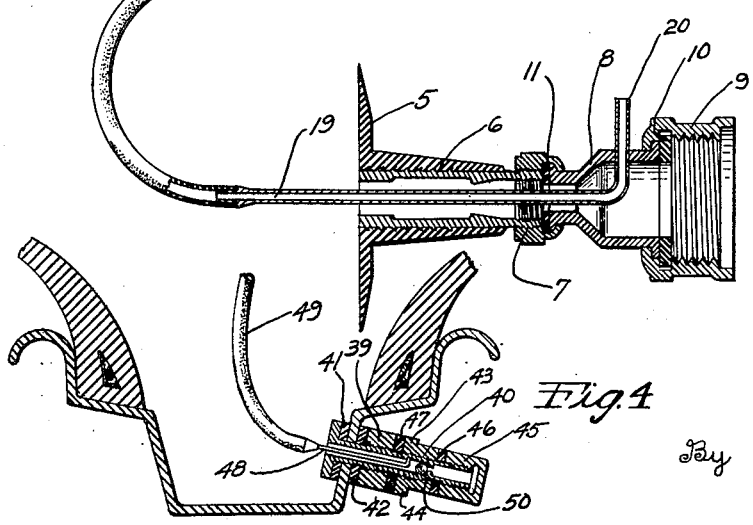
Inventor.
Andrew J. Palko
By
Attorney Patented Feb. 23, 1943

2,311,901

UNITED STATES PATENT OFFICE 2,311,901

AIR VENT

Andrew J. Palko, Akron, Ohio, assignor to Wingfoot Corporation, Wilmington, Del., a corporation of Delaware Application December 18, 1940, Serial No. 370,654

1 Claim. (Cl. 152—415)

This invention relates to an air vent for removing the air while filling with water the annular cavity in the cushioning means on a vehicle wheel. This cushioning means may be the ordinary inner tube inclosed in a rubber tire, or it may be a tire without the inner tube in which case the cavity may be formed within the tire itself or it may be formed between the tire and the rim of the wheel of the vehicle.

In order to completely fill a tire (with or without a tube) with water or other liquid, such as a liquid which will not freeze at low temperatures, it is necessary to provide means for removing the air. According to this invention a small rubber tube is used for this purpose. At one end the tube is attached to some material which will float on the liquid and keep the opening of the tube above the liquid level. At the other end the tube is connected to the atmosphere outside the tire, preferably through the valve means through which the water or other liquid is introduced. The tube may be removed after the cavity is filled with water, or it may be allowed to remain in the cavity during use.

The invention will be further described in connection with the following drawing in which Fig. 1 is a section through a tire and tube equipped with the air vent of this invention. Fig. 2 is a section through a tire mounted directly on a rim, without an inner tube, equipped with the air vent of this invention. Fig. 3 is a section through a valve of the type shown in Fig. 1 with the air vent attached thereto. Fig. 4 is a detail showing a modified type of valve.

In order to fill a tire with liquid the wheel on which it is mounted is turned so that the valve is at the high point of its cycle. A tire or tube is most easily filled with liquid when the wheel is in this position. In Figs. 1, 2 and 4 the wheel is represented as being in this position.

In Fig. 1 the tire 1 and inner tube 2 are mounted in the usual way on the rim 3. The valve 4 is united to the inner tube 2 by the rubber flange 5 in the usual way, and the metal interior 6 of the valve, shown in detail in Fig. 3, is the interior commonly employed with a valve used for inflating a tube with air, as will be evident from the contour of the inner wall of the metal portion 6, although the spring, etc. have been removed from the central portion of the valve. The top of the valve is threaded externally at 7 as is usual in such valves. The reducing section 8 which is screwed onto these threads 7 connects the valve with the coupling 9 which is adapted to be screwed to the end of a water hose. Gaskets 10 and 11 are provided to insure tight joints.

The air vent comprises the small, highly flexible rubber tube 15 which is preferably of the light weight type deposited from latex. It may, for example, be about ⅛ to ¼ of an inch in diameter. It is long enough to extend from the valve to the periphery of the inner wall of the tube 2. The cork or balsa wood tip 16 floats on the water with which the inner tube is filled and carries with it one end of the tube 15. Any means may be employed to cause the inner end of the tube to float above the water level. A suitable hollow float may be employed or ground cork or the like may be cemented to the outside of the tube at and near its end.

The opening 17 in the end of the tube is always carried above the water level, so that as the water supplied through the hose 18 fills the inner tube 2 the air is vented through the opening 17 and the tip 16 down through the tube 15 and out through the metal tube 19 which ends in the air escape 20. In filling the inner tube 2, the water or other liquid is supplied through the hose 18 until all the air has been removed and liquid is forced out through the air escape 20. It is then known that the tube is entirely filled with liquid and the water supply is shut off. The reducing section 8 is then unscrewed from the valve, the tube 15 quickly drawn out through the valve opening, and a valve cap put in place before any great amount of water has been lost.

Instead of putting the valve cap on at this stage of the process a smaller water line may be screwed onto the threads 7. Further water may then be introduced into the tube, and the tube may be placed under any desired hydrostatic pressure. The pressure may be maintained on the tube by providing suitable valve means for closing the valve 6, and the water line may then be disconnected.

A similar air vent is shown in Fig. 2, except that in Fig. 2 there is no inner tube. The tire 20 is mounted directly on the rim 21 and the valve 23 is connected with the rim instead of being united to the inner tube. The water cavity is formed between the tire and the rim 21. In other respects the equipment is substantially that shown in Figs. 1 and 3.

Difficulty may be experienced in mounting the tire directly on the rim without an inner tube. This may be done by applying rubber vacuum cups to the side wall on each side of the tire, and by means of these, spreading the beads 24 to cause them to become properly seated in the seats 25 provided on the rim. By properly seating the tire on the rim a water-tight seam is formed between the tire and rim, and the tire may then be inflated with water. It may be necessary to hold the beads on the rim seats by means of the vacuum cups until sufficient water pressure is developed within the tire to prevent the beads from becoming unseated.

Fig. 4 shows a modification of the invention in which the air vent is permanently retained within the tire (or tube) after inflation with water. The valve stem 40 is pushed out through a suitable hole provided in the rim and held in place by screwing the nut 39 in place. Gaskets 41 and 42 provide a water-tight seal which prevents leakage of the water from within the tire through this hole. The section 43 of the valve is threaded internally so that it may be screwed on and off of the valve stem. The surface 44 is preferably roughened or made hexagonal in shape so that a wrench may be applied to tighten it against the gasket 47 when desired. The cap 45 is also threaded internally and screwed onto the valve stem 40. The gaskets 46 and 47 provide tight joints. To fill the tire with water the cap 45 is removed. The section 43 is then unscrewed a number of turns so that the opening of the metal tube 48, which connects the rubber portion 49 of the air vent with the atmosphere outside of the tube, is opened to the atmosphere. A suitable water connection is then screwed onto the valve stem. The water pressure is turned on and the tire is filled with water. As the tire fills the air escapes through the tubes 48 and 49. The end of the tube 49 which is not shown is provided with a floating tip, such as that shown in Fig. 3. When the tire becomes completely filled with water, and there is no more air to escape through the tubes 48 and 49, a small jet of water will spurt out from the tube 48. The water supply is then shut off, the section 43 of the valve is tightly screwed onto the gasket 47 so as to prevent the escape of water, and the cap 45 is then again screwed in place. No water can then escape from the valve. After all the air has been removed from the tire any reasonable hydrostatic pressure can be built up within the tire, before disconnecting the source of water, by screwing the section 43 of the valve down against the gasket 47 to prevent any loss of water through the vent, and then continuing to supply water until the desired pressure is built up. The check valve 50 will then maintain the hydrostatic pressure while the water source is being disconnected and the cap 45 is being put in place.

As will be evident from the description the air vent of this invention is not limited to use with any particular type of valve mechanism.

What I claim is:

In combination in apparatus for filling a pneumatic tire 100% with water, a drop center rim, an open beaded tire mounted on the rim, a valve stem extending in sealing relation through the well of the rim and opening into the cavity within the tire, a metal tube of smaller outside diameter than the inside of the valve stem extending from the outside atmosphere through at least a part of the valve stem and into the cavity formed by the rim and tire but substantially terminating within the well of the drop center rim, a flexible rubber tube secured at one end to the end of the metal tube within the cavity and of a length somewhat greater than the radial distance from the well of the rim to the radially inner surface of the tread of the tire, means on the other end of the rubber tube for floating that end of the tube on top of any water in the tire and with that end of the tube open to bleed any entrapped air from within the tire cavity, and means for supplying water to the tire cavity through the valve stem.

ANDREW J. PALKO.